Dec. 10, 1968     H. H. PASE     3,415,204
HOPPER GATE SEALING MEANS
Filed Aug. 3, 1966     2 Sheets-Sheet 1

INVENTOR:
HUGH H PASE
BY Steward & Steward
his Attorneys.

INVENTOR:
HUGH H. PASE
BY Steward & Steward
his attorneys.

United States Patent Office 3,415,204
Patented Dec. 10, 1968

3,415,204
HOPPER GATE SEALING MEANS
Hugh H. Pase, 75 Creamery Road,
Cheshire, Conn. 06410
Filed Aug. 3, 1966, Ser. No. 570,085
9 Claims. (Cl. 105—282)

ABSTRACT OF THE DISCLOSURE

A device for sealing hopper doors having sliding gates commonly used in railroad hopper cars, in which a frame-like sealing member fits in telescoping manner within the opening of the door and is supported along its under edge entirely by the sliding gate, the upper edge of the sealing member being at least partially exposed to the load, so that the load forces it down into tight sealing engagement with the gate.

---

This invention relates to hopper outlets such as those employed in railroad freight cars for handling granular solids, for example grain or cement. More particularly the invention relates to hopper doors, in which a sliding gate is provided for closing the discharge opening at the bottom of the hopper in order to contain the load.

It is difficult to provide a weather-tight door in hopper cars which will open readily under the heavy load of the product being carried, especially in the winter in cold climates if water leaks in through the hopper door and freezes. Prior attempts to seal the door or gate with the frame of the opening have usually involved means for forcing the gate upward against the frame of the opening. An arrangement of this kind is shown, for example, in the patent to Dorey 2,783,739. These designs, however, have not been entirely satisfactory, because of the extremely large forces required in order to move the door from a fully closed position. Furthermore, the door may not align properly with the door frame so that snow, slush and rain can work their way inside and will then freeze solid when the weather turns cold. Concrete, of course, hardens if it becomes damp due to leakage in the hopper door and may make it virtually impossible for the door to be opened without severely damaging it.

It is accordingly an object of the present invention to provide a hopper door which seals tightly with the frame of the hopper when closed, yet can be readily opened in order to dump the load.

In the construction of hopper doors, it is common practice to provide a sliding gate which is mounted on rollers in order to facilitate its movement between open and closed positions. Such movement is accomplished by drive sprockets that engage racks fixed to opposite sides of the sliding door. One or more hand cranks for opening and closing the doors are employed at either or both ends of the drive shaft on which the drive sprockets are mounted. The present invention is especially adapted for use in hopper doors of this general construction for the purpose of overcoming the problems of leakage and sticking which such doors have encountered heretofore.

In general the present invention involves the provision of a relatively rigid, frame-like member which fits within the discharge opening of the hopper in telescoping relation therewith and seals the gate with the walls of the opening. This member, hereinafter sometimes referred to as an inner sleeve member or "floating" sleeve, is free to move with respect to the walls of the opening and is supported along its under edge on the upper surface of the gate, in sealing engagement therewith. Means are provided for sealing the sleeve member with the walls of the opening so that leakage does not occur around the periphery of this member. For example, an inwardly projecting skirt or flange may be fixed to the walls of the hopper so that it covers the upper edge of the floating sleeve and prevents the material in the hopper from flowing between it and the walls of the opening. It has been found highly desirable to provide a resilient gasket in the space between the upper edge of the floating sleeve member and the covering flange, in order to prevent leakage at this point while at the same time permitting automatic adjustment of the floating sleeve so that it rests tightly along its entire under edge on the gate when the latter is closed.

A sealing gasket in the under edge of the floating sleeve member is also desirable in order to ensure a tight seal with the gate. The inner sides of the sleeve member may be sloped downwardly to assist in the free flow of the material through the discharge opening when the gate is open.

An advantage of the present invention resides in the fact that the material in the hopper forces the floating sleeve down into sealing engagement with the gate, thereby helping to seal the door. However, the pressure on the sleeve against the door need not be so great that it is difficult to open the gate after the car is loaded, as is the case in prior hopper door constructions, in which the gate is forced down against seal in the frame of the discharge opening. Moreover, the amount of pressure between the sealing sleeve and the gate can be controlled by the horizontal thickness of the sleeve and, where a covering flange is employed, by the extent to which it projects over the upper edge of the sleeve.

These and other important advantages and objects of the invention will become more apparent from the specific description hereinafter of one embodiment of the invention intended for installation in railroad cars, reference being had to the accompanying drawings, wherein.

Figure 2:
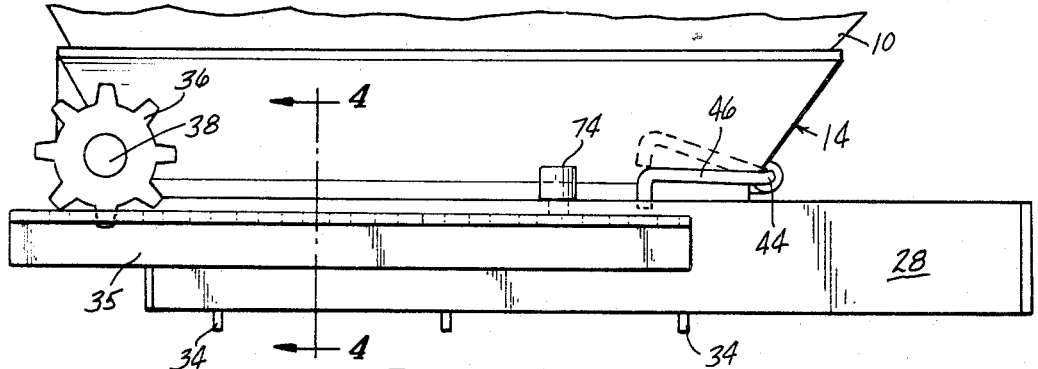
FIG. 2 is a side elevation of the construction shown in FIG. 1.
Figure 3:
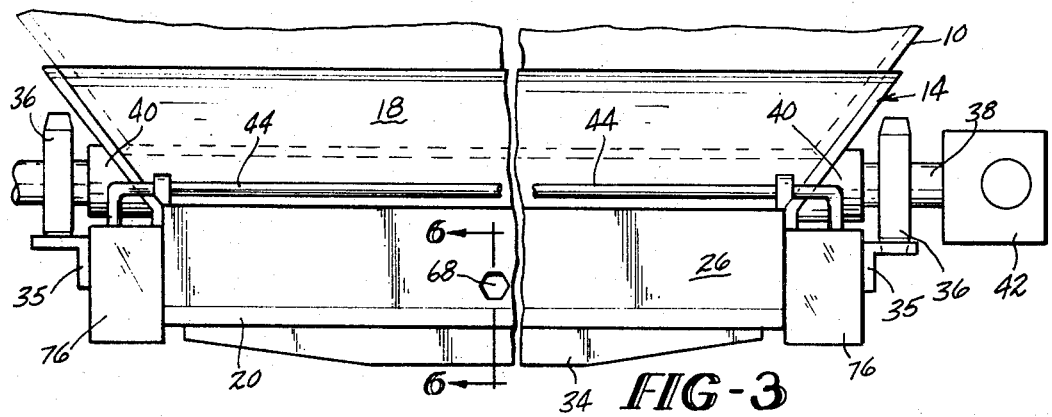
FIG. 3 is a foreshortened end view thereof, looking from the right hand side as shown in FIG. 2.
Figure 5:
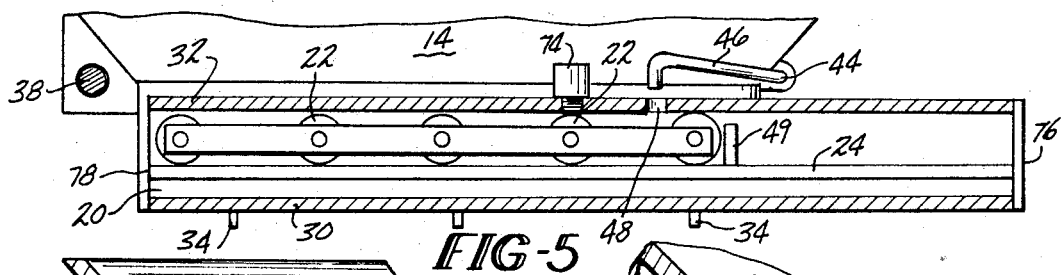
Figure 4:
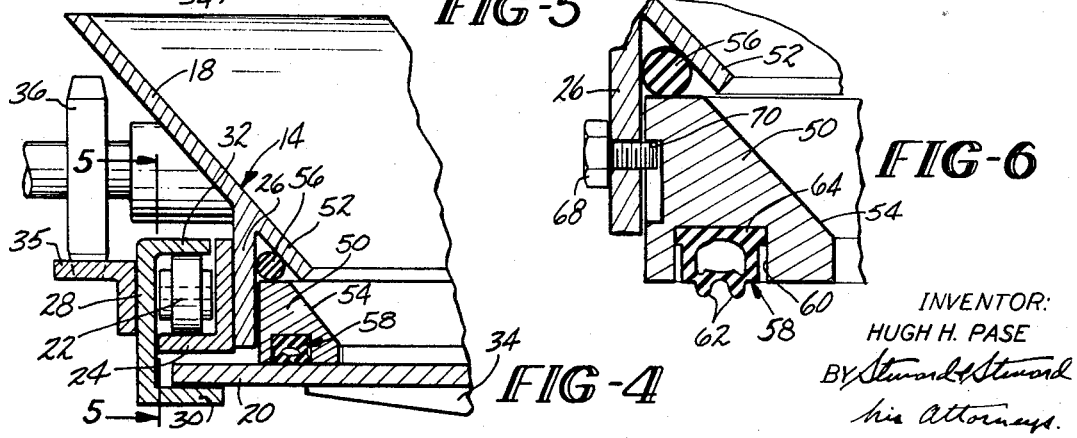
FIG. 4 is an enlarged sectional detail view taken on the line 4—4 of FIG. 2.
Figure 6:
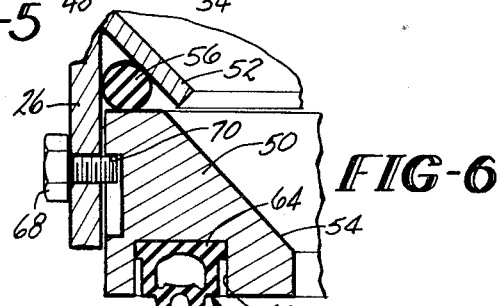

FIG. 5 is a section on the same scale as FIGS. 2 and 3, but taken on the line 5—5 of FIG. 4; and FIG. 6 is an enlarged section taken on the line 6—6 of FIG. 3 showing a cross-section of the floating sleeve and a retaining means for preventing the floating sleeve from dropping out of the discharge opening when the gate is removed for cleaning or repair.

Figure 1:
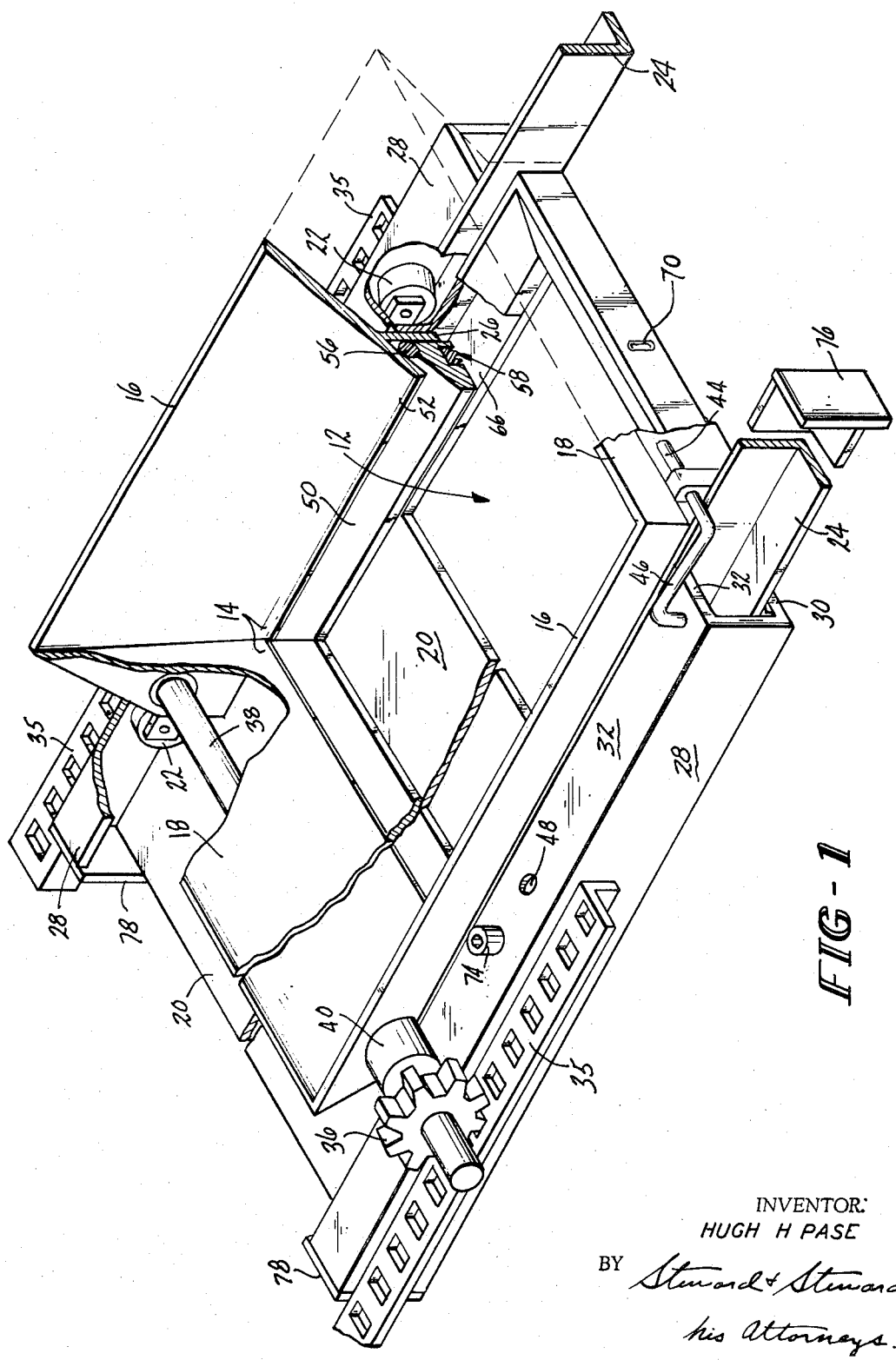
FIG. 1 is a perspective view of a hopper door construction in accordance with the invention, parts of the hopper walls, frame and tracks for the gate being broken away and foreshortened for illustration purposes.

Referring to the drawings, the hopper door construction shown is adapted to be mounted at the bottom of a hopper 10 (FIGS. 2 and 3) in which grain or other granular solids are carried. A rectangular discharge opening 12 for the hopper is formed by a frame 14 having outwardly flaring side walls 16, 16 and end walls 18, 18, which are bolted, riveted or welded to the bottom edges of the hopper 10 of the railroad car. In FIG. 1 the side and end walls 16 and 18 of the hopper door frame are broken away and shown partly in phantom in order to expose parts behind them. The side walls 16 extend longitudinally of the car, and the whole hopper door construction is shown foreshortened laterally of the car by being broken away along a line extending longitudinally of the structure. FIG. 3 is similarly broken in the longitudinal direction for illustration purposes.

A gate 20 for closing discharge opening 12 is mounted so that it slides longitudinally of the structure across the opening, gate 20 being shown partially open in FIG. 1. As best seen in FIG. 4, gate 20 is slidingly supported on roller assemblies 22 at both sides of the door frame 14. Rollers 22 ride on fixed tracks 24 extending longitudinally of the door frame 14 and rigidly mounted, as by welding, to vertical side walls 26, which depend from the lower edge-portions of the sloping side walls 16 of frame 14. If desired, tracks 24 may be formed by an outwardly extending flange along the bottom edge of the vertical side wall 26 and integral therewith.

A U-shaped supporting beam 28 at each side of gate 20 has a lower flange 30 welded or otherwise rigidly fixed to the underside of gate 20 along its entire length. The upper flange 32 of each beam 28 extends inwardly so that it extends over rollers 22 and rests on them in supporting engagement therewith. Gate 20 is thereby supported at both sides on rollers 22, which in turn ride on tracks 24 on the frame 14. Gate 20 is reinforced by spaced parallel beams 34 which extend across its underside. It will be apparent from the foregoing that gate 20 glides horizontally on rollers 22 across the opening 12 of the hopper between a retracted or fully open position and a position completely closing the opening 12. In FIG. 1, gate 20 is shown partially retracted, while in FIGS. 2, 3 and 5 it is completely closed.

A gear-rack 35 is rigidly mounted on the outer side of the web-portion of each of the beams 28 for driving engagement with a sprocket 36 fixed adjacent each end of a shaft 38 which is journalled in bearings 40 mounted on the frame 14 of the hopper door at one end thereof. As may be seen in FIG. 3, an operating nut 42 is provided at one end of shaft 38, to which a crank or operating bar (not shown) may be attached for rotating sprockets 36 in order to drive the gate 20 into and out of hopper closing position.

Suitable means for locking the gate 20 closed are provided, such as the lock bar 44, which is pivoted on frame 14 transversely thereof and has a latching arm 46 at each end with a downwardly projecting hooked end that is engageable with a recess or hole 48 in the upper flange 32 of each support beam 28 of gate 20. When the gate is closed, the hooked ends of latching arms 46 engage within recesses 48, locking the gate in place. In order to position roller assemblies 22 lengthwise relative to the fixed tracks 24 and sliding beams 28, a stop 49 (FIG. 5) is provided on the upper side of the flange of each track 24, against which roller assembly 22 rests when the door is fully closed.

As may be seen in FIGS. 1, 4 and 5, the hopper door of the present invention is provided with a rectangular, inner sleeve 50, which fits within the opening 12 at the base of the sloping walls 16, 18 of the door frame 14. Sleeve 50 is entirely supported on and by the upper surface of the gate 20 with its periphery fitting loosely within the vertical side walls 26 of frame 14, the outside dimensions of sleeve 50 being sufficiently less than the corresponding dimensions between walls 26 to allow the sleeve to move freely in a vertical direction relative to walls 26. A skirt 52, which may be formed by integral extensions of sloping walls 16 and 18 of the hopper door, extends partially across the upper edge of the hollow sleeve 50 into overlapping relation with a sloping surface 54 on the inner side of sleeve 50. A resilient gasket 56 is provided in the space between vertical side walls 26, the skirt 52 and the upper edge of the floating sleeve 50, in order to ensure a tight seal between sleeve 50 and the walls of the opening. In some instances, however, provision of the sealing gasket 56 may be unnecessary due to the overlapping arrangement of skirt 52 and sleeve 50.

As best seen in FIG. 4, the floating sleeve 50 rests flush on the gate 20, with which it is in sealing engagement along its entire undersurface. Again, in order to ensure a tight seal between sleeve 50 and the hopper gate 20, a sealing gasket 58 is provided in a groove 60 in the under edge of sleeve 50. Gasket 58, which extends all the way around sleeve 50, is desirably of tubular cross section as shown in FIG. 6, and may be provided with a pair of depending ridges 62, 62 extending longitudinally of it. The base portion 64 of gasket 58 fits snugly within the bottom of groove 60, while the remainder of the gasket is somewhat narrower than said groove. Ridges 62, 62 extend below the lower surface of sleeve 50 when the gate 20 is removed, as shown in FIG. 6.

When gate 20 is in place, the ridges fold inwardly toward each other, collapsing the lower portion of the gasket into the hollow center of the gasket. This provides a particularly good seal. It has been found, moreover, that when the leading edge of gate 20 engages the corresponding side of the opening 12 as the door closes tight, the inner ridge 62 of gasket 58 is pushed outward of the opening causing it to collapse into the hollow center of the gasket. This pulls the outer ridge 62 inward against the movement of the gate and forms a tight seal therewith in order to prevent moisture from entering the door.

From the foregoing it will be apparent that any misalignment or deformity between the gate 20 and the frame 14 of the hopper door is compensated for by the floating sleeve 50, which rides up or down on the upper surface of gate 20, thereby maintaining good sealing engagement therewith. Moreover, the pressure of the load contained by the door is exerted downward on the sloping surface 54 of sleeve 50, forcing the latter into engagement with gate 20. Such downward pressure also ensures a good seal all around the door but, due to the limited effective area of sleeve 50, the pressure between the sleeve and the gate is not so great as to make it difficult to open when the hopper is fully loaded. It will be apparent, moreover, that the effective area of sleeve 50 can be selected in advance in order to provide optimum results. This can be done either by increasing or decreasing the horizontal thickness of sleeve 50, or by increasing or decreasing the width of skirt 52.

In order to provide support for sleeve 50 when gate 20 is open, a pair of parallel legs 66 (FIG. 1) extend forward from the leading edge of gate 20, legs 66 being spaced from each other a distance equal to the width of opening 12, so that when gate 20 is open legs 66 are disposed along opposite sides of opening 12 and support sleeve 50 at both sides. Support beams 28, which are rigidly secured to both sides of gate 20, extend the full length of the gate and of the legs 66.

Since gate 20 must be removed occassionally in order to clean or replace the sealing gasket 58, it is desirable to provide means for preventing sleeve 50 from dropping completely out of the unit as gate 20 is retracted far enough so that its leg 66 no longer provide support for sleeve 50. To this end, two assembly bolts 68 (FIGS. 3 and 6) are threaded through the vertical wall 26 of frame 14 at opposite sides thereof. The ends of bolts 68 fit into vertical grooves 70 formed in the outer sides of sleeve 50 adjacent bolts 68. When gate 20 is removed, sleeve 50 drops down until the upper end of each groove 70 engages bolt 68 which then support the sleeve. However, when gate 20 is in place, sleeve 50 is free to move up and down within the opening because grooves 70 are long enough so that bolts 68 do not interfere with the floating action of said sleeve. If for any reason it is desired to remove sleeve 50 from the assembly, bolts 68 are simply backed out until their inner ends no longer project into the grooves 70.

A pair of stop bolts 74 threaded into the upper flange 32 of gate-supporting beams 28 are positioned longitudinally of beam 28, so that as the gate is retracted to its fully open position, bolts 74 engage stop-surfaces on the bosses 40 at opposite ends of the drive shaft 38, preventing the gate from being moved beyond this position. Stopbolts 74 are easily removed in order to slide the gate completely out for cleaning or repair. Cover plates 76 are rigidly mounted on the outer ends of tracks 24 in order to prevent foreign matter from getting into the roller assemblies and also to act as stops for the beams 28 when gate 20 is completely closed. Similarly, a pair of cover plates 78 is provided at the rear ends of the sliding beams 28, plates 78 also acting to retain the roller assemblies 22.

From the foregoing, it will be apparent that a relatively inexpensive hopper door construction is provided which will seal tightly and work freely under heavy loads and extremely severe conditions. Furthermore, it is easy to maintain.

It should be particularly noted that even if the frame of the hopper door is perfectly square, due to warping or inaccurate assembly, or if the plate forming the gate 20 is bent slightly, the floating sleeve 50 of the present invention compensates for any normal misalignment of the gate with the walls of the opening by conforming to the contour of the gate and compensating for irregularities in the alignment of the opening. This is accomplished, moreover, without jamming or wedging the door closed, which makes it extremely difficult to open. While the sleeve 50 is relatively rigid, it still has enough give to be forced by the load in the hopper down tight against the gate 20 despite warpage in the gate. In fact in some instances where a water-tight seal is not required, use of the floating sleeve of the present invention even makes it possible to eliminate the resilient gaskets 56 and 58.

While only one embodiment of the invention is shown in the drawings, various modifications and changes can be made.

What is claimed is:

1. In a load-containing door for a hopper having a frame defining a discharge opening and a substantially flat gate for closing the opening, said gate being mounted on the frame of the door for movement in its own plane along a path parallel to the opening into and out of closing relation therewith, a device for sealing the gate within said opening which comprises in combination, a relatively rigid inner sleeve member disposed in telescoping relationship within said opening, said door frame having wall members completely surrounding said sleeve member and confining it against lateral movement, said sleeve member being open within its inner boundary for the passage of the material in the hopper when said gate is open, said sleeve member being in engagement along its entire under edge with the upper surface of said gate and being supported thereby, the upper edge of said sleeve member being at least partially exposed upwardly throughout its extent for direct engagement by the material with which the hopper is loaded, said wall members adjacent the periphery of said sleeve member being substantially parallel to a central axis through said opening, such that said sleeve member is adjustably movable in the direction of said axis within said opening under the pressure of the material in said hopper and is forced into sealing engagement with said gate along its entire under edge when said gate is closed, and means for sealing said sleeve member with said wall members while permitting such axial movement of said sleeve member within said opening.

2. A device for sealing the gate for a hopper door as defined in claim 1, wherein said means for sealing said sleeve member with said wall members comprise a sloping skirt mounted above said wall members and overlapping the peripheral portion of said sleeve member along its entire extent.

3. A device as defined in claim 2, wherein said means for sealing said sleeve member with said wall members further includes a resilient gasket disposed between said sleeves member, wall members and skirt against which said sleeve member is urged by said gate.

4. A device as defined in claim 3, wherein said sleeve member is provided with a continuous groove extending along its entire under edge and further including a second resilient gasket mounted within said groove, said second gasket being hollow and having a pair of continuous ridges extending longitudinally thereof and projecting below the under surface of said sleeve member for engagement with the upper surface of said gate for further ensuring a tight seal therewith.

5. A device as defined in claim 1, wherein said sleeve member is provided with a gasket along its entire under edge for further ensuring a moisture tight seal between said sleeve member and said gate.

6. A device as defined in claim 5, wherein said gasket is mounted within a groove in the under edge of said sleeve member, said gasket being hollow and having a pair of continuous ridges extending longitudinally thereof and projecting below the under surface of said sleeve member.

7. A device as defined in claim 1, wherein said gate is provided with spaced parallel legs extending beyond its leading edge on opposite sides of the opening for supporting said sleeve member when said gate is open.

8. A device as defined in claim 7, wherein said wall members of said opening and said sleeve member are provided with auxiliary means for supporting said sleeve member upon disassembly of said gate from said door.

9. A device as defined in claim 8, wherein said auxiliary support means comprises on opposite sides of said opening a recess in one of said wall and sleeve members, said recess being elongated in the direction of said central axis, and a bolt secured to the other of said members and projecting into said elongated recess, such that when said gate is normally assembled in said door, said bolt and elongated recess move with respect to each other to permit said sleeve member to shift in said axial direction within said opening, said elongnated recess having a closed end for engagement with said bolt when said gate is disassembled from the door in order to support said sleeve member within said opening during such disassembly.

References Cited

UNITED STATES PATENTS 3,097,612  7/1963  Dorey _____ 105—282
3,255,714  6/1966  Dorey _____ 105—424 XR ARTHUR L. LA POINT, *Primary Examiner.*

H. BELTRAN, *Assistant Examiner.*

U.S. Cl. X.R.

105—305, 424